United States Patent [19]
Kim

[11] Patent Number: 5,318,101
[45] Date of Patent: Jun. 7, 1994

[54] THERMAL ACCUMULATION TYPE HEATING AND COOLING DEVICE USING HEAT TRANSFER MEDIUM

[76] Inventor: Han-Joong Kim, 73-1, Jeong-ja 2 Dong, Jang-an ku, Suwon City, Kyeongki Do, Rep. of Korea

[21] Appl. No.: 890,665

[22] Filed: May 28, 1992

[30] Foreign Application Priority Data

| Jun. 13, 1991 | [KR] | Rep. of Korea | 91-8772 |
| Jun. 26, 1991 | [KR] | Rep. of Korea | 91-9593 |
| Jul. 3, 1991 | [KR] | Rep. of Korea | 91-10086 |
| Jul. 10, 1991 | [KR] | Rep. of Korea | 91-10511 |
| Feb. 12, 1992 | [KR] | Rep. of Korea | 92-2006 |

[51] Int. Cl.$^5$ .............................................. F28D 20/00
[52] U.S. Cl. ............................... 165/10; 165/122; 165/45; 126/101; 392/341; 392/344
[58] Field of Search ............. 126/101; 165/10, 104.19, 165/122; 392/341, 344

[56] References Cited

U.S. PATENT DOCUMENTS

| 1,884,634 | 10/1932 | Emans | 126/101 |
| 2,207,313 | 7/1940 | Crouch | 165/122 |
| 2,643,323 | 6/1953 | Carlson et al. | 126/101 |
| 3,833,170 | 9/1974 | Marshall | 126/101 |

FOREIGN PATENT DOCUMENTS 162673 of 0000 Sweden ......................... 126/101

*Primary Examiner*—Albert W. Davis, Jr.
*Attorney, Agent, or Firm*—Salter, Michaelson & Benson

[57] ABSTRACT

A heating and cooling device comprising a box type heat exchange tank containing a heat transfer medium having an thermal accumulation effect therein and a heat exchange pipe arranged in said heat exchange tank. An air discharging member is mounted to an outlet of the heat exchange pipe and provided with a fan for blowing air in the heat exchange pipe into a room. An air suction member connected to said inlet of the heat exchange pipe, to suck outside air and supply it into the heat exchange pipe, A heater is disposed just below said air suction member, to heat an air entering the air suction member in a heating operation of the device. A cooling chamber is also disposed, to cool the heat transfer medium in the heat exchange tank. A water pump may be disposed below the heat exchange tank, so as to pump a relatively cold underground water into the heat exchange tank. The underground water is used as the heat transfer medium for a cooling operation of the device. The heater may be adapted to heat directly the heat transfer medium contained in the heat exchange tank. In place of heat transfer tank, a heat exchange body may be used which comprises a plurality of stacked blocks having a thermal accumulation effect.

2 Claims, 6 Drawing Sheets

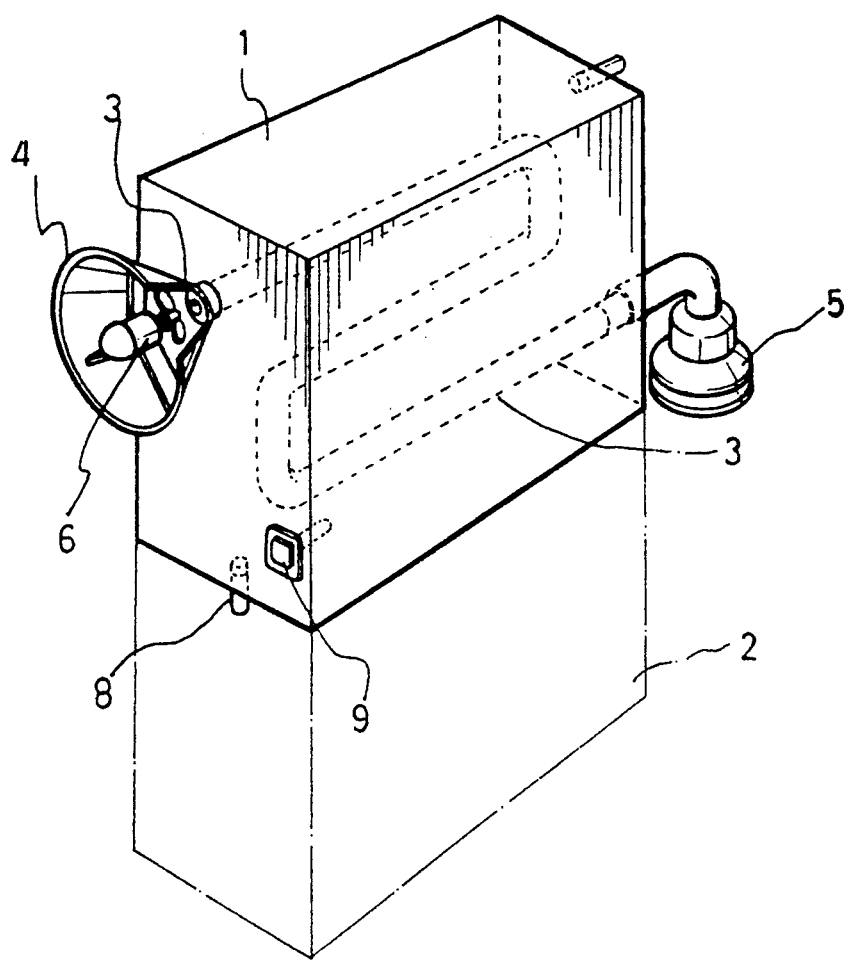
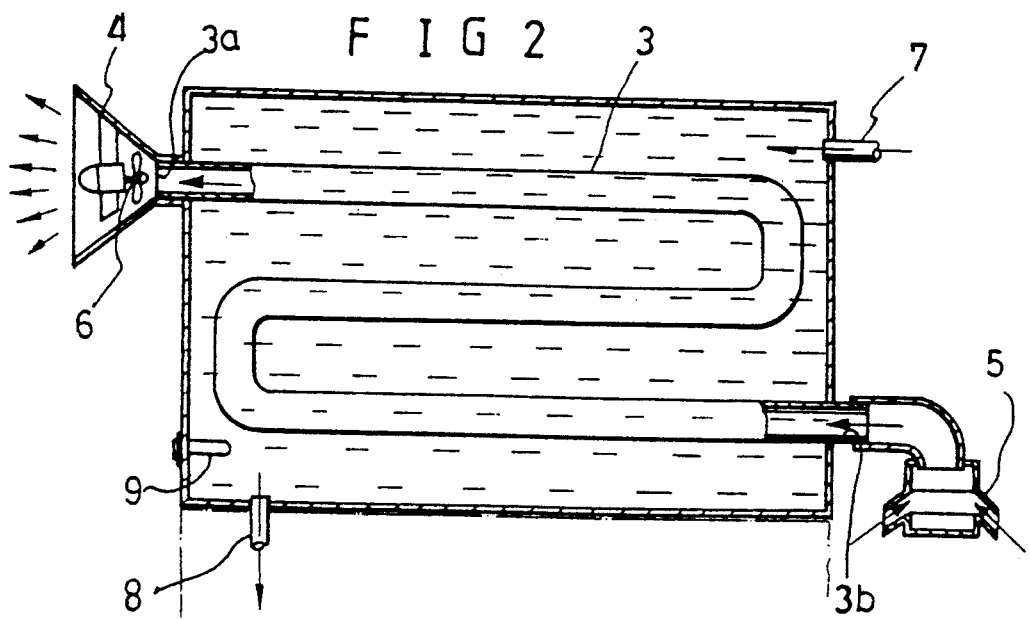

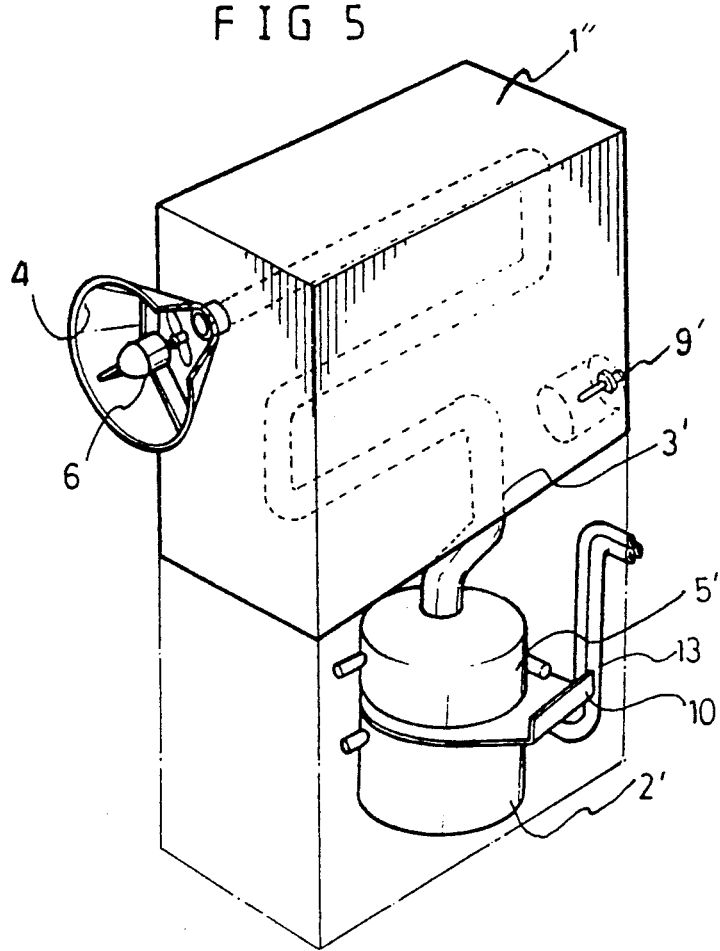
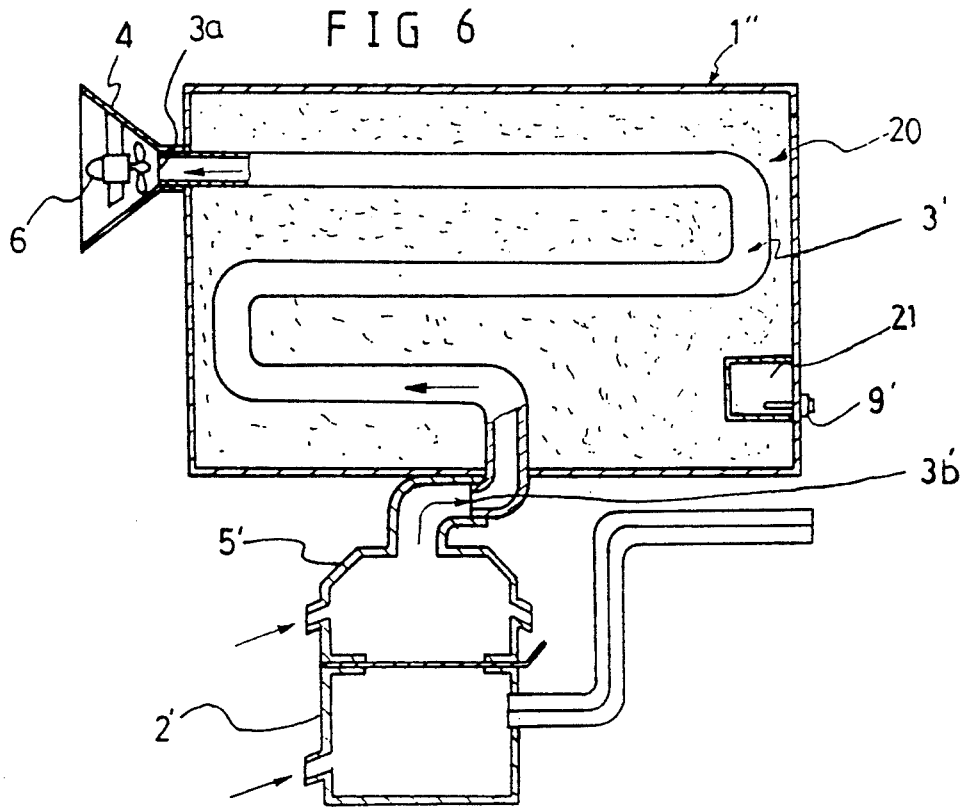

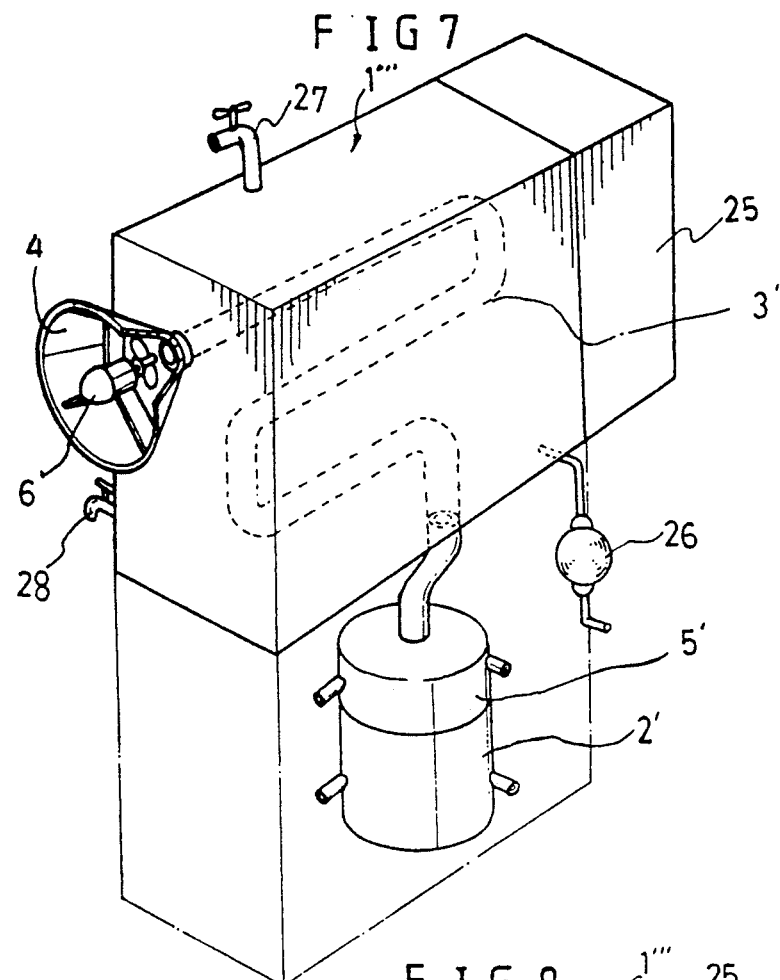
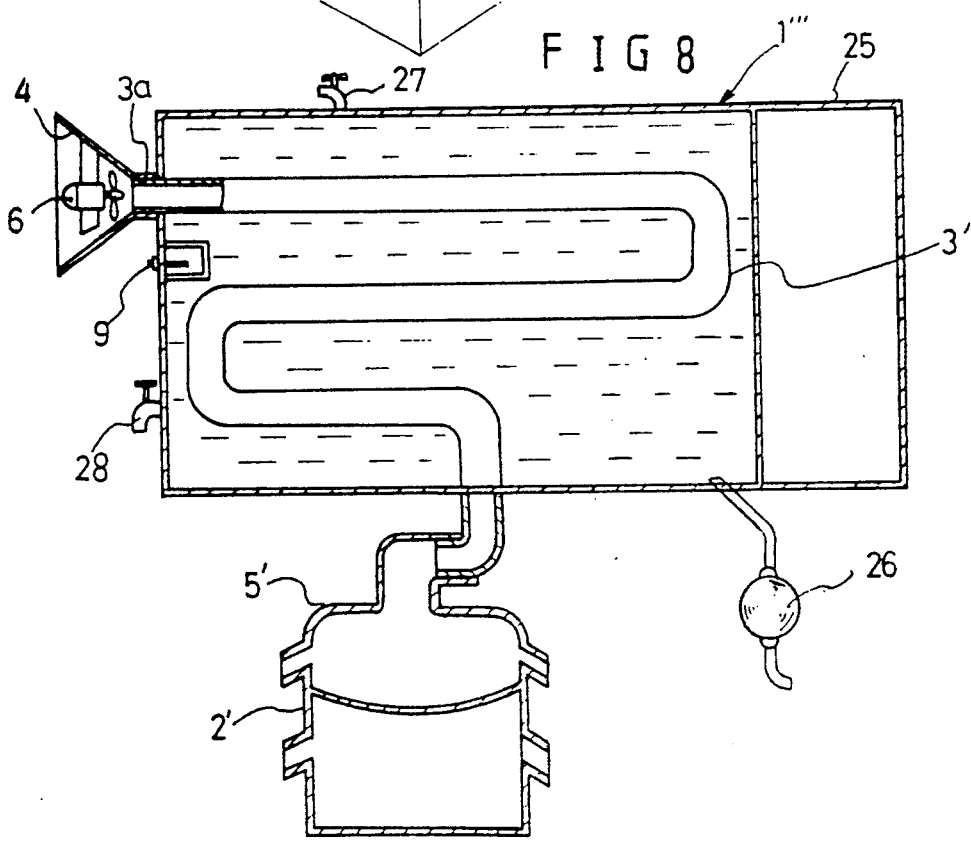

THERMAL ACCUMULATION TYPE HEATING AND COOLING DEVICE USING HEAT TRANSFER MEDIUM

BACKGROUND OF THE INVENTION

1. Field of the Invention

The present invention relates to a heating and cooling device, and more particularly to a thermal accumulation type heating and cooling device using a heat transfer medium.

2. Description of the Prior Art

In a conventional heating and cooling device, its heating and cooling effects are obtained by heating or cooling air to predetermined heating or cooling temperatures by an energy source such as oil, gas or electric power and blowing the heated or cooled air by a fan. In such a heating and cooling device, however, air which has not been subjected to a heating or cooling treatment may be mixed with the heated or cooled air during the blowing operation, thereby causing the thermal efficiency to be reduced. On the other hand, when the room temperature reaches an optionally predetermined temperature after a continued heating or cooling operation of the heating or cooling device, the heating or cooling operation is temporarily stopped by an automatic temperature controller such as a thermostat. The heating and cooling device operates again, when the room temperature is below or above the predetermined temperature because of the stopping of heating or cooling operation. A repeated switching of this heating or cooling operation and stopping thereof results in an undesirably high consumption of energy such as oil or electric power. Upon every switching of the heating or cooling operation, a noise also occurs. Furthermore, a continued repetition of switching causes the heating and cooling device to be overloaded and be thus out of order frequently. As a result, the heating and cooling device has disadvantages of a requirement of its frequent maintenance and a very short life time.

In this regard, the conventional heating and cooling device is no economy in terms of energy consumption and also makes it impossible to maintain a comfortable room atmosphere due to the generation of noise.

SUMMARY OF THE INVENTION

Therefore, an object of the invention is to eliminate the above-mentioned disadvantages encountered in the prior art and to provide a heating and cooling device which is capable of reducing an energy consumption and an occurrence of noise, as well as lengthening the life time.

Another object of the invention is to provide a heating device wherein the mounting and the maintenance thereof can be easily carried out, thereby enabling an improvement in economy.

Another object of the invention is to provide a heating device wherein the total operation time thereof and the total number of switchings of the operation can be considerably reduced, so that a minimization in noise and a reduction in operation cost can be achieved.

In one aspect, the present invention provides a heating and cooling device comprising: a box type heat exchange tank containing a heat transfer medium having an thermal accumulation effect therein; a heat exchange pipe arranged in said heat exchange tank and having an outlet protruded outwardly through the upper portion of one side wall of the heat exchange tank and an inlet protruded outwardly through the bottom wall of the heat exchange tank; an air discharging member having a flared shape mounted to said outlet of the heat exchange pipe and provided with a fan adapted to blow air in the heat exchange pipe into a room in which the device is placed; an air suction member connected to said inlet of the heat exchange pipe and adapted to suck outside air and supply it into the heat exchange pipe; a heater disposed just below said air suction member and adapted to heat an air entering the air suction member in a heating operation of the device; a temperature sensor disposed at the lower portion of one side wall of heat exchange tank, to sense the temperature of the heat transfer medium in the heat exchange tank; a cooling chamber disposed at said other side wall of the heat exchange tank and provided with a cooler adapted to cool the heat transfer medium in the heat exchange tank; a water pump disposed below the heat exchange tank and adapted to pump a relatively cold underground water into the heat exchange tank, said underground water being used as the heat transfer medium for a cooling operation of the device; a water discharging cock provided at the upper wall of the heat exchange tank; and a hot water discharging cock provided at said one side wall of the heat exchange tank.

In another aspect, the present invention also provides a heating device comprising: a box type heat exchange tank containing a heat transfer medium having an thermal accumulation effect therein, said heat transfer medium being water; a heater disposed below the heat exchange tank and adapted to heat said heat transfer medium; a heat exchange pipe arranged in said heat exchange tank and having an outlet protruded outwardly through the upper portion of one side wall of the heat exchange tank and an inlet protruded outwardly through the lower portion of the other side wall of the heat exchange tank; an air discharging member having a flared shape mounted to said outlet of the heat exchange pipe and provided with a fan adapted to blow air in the heat exchange pipe into a room in which the heating device is placed; an air suction member connected to said inlet of the heat exchange pipe and adapted to suck outside air and supply it into the heat exchange pipe; an inlet and an outlet adapted to charge/discharge the heat transfer medium into/from the heat exchange tank and provided at the upper portion of the other side wall of the heat exchange tank and a portion of the bottom wall of the heat exchange tank near one side wall, respectively; and a temperature sensor disposed at the lower portion of one side wall of heat exchange tank, to sense the temperature of the heat transfer medium in the heat exchange tank; whereby the air passing through the heat exchange pipe is heated by the heated heat transfer medium and then discharged out of the outlet of the heat exchange pipe.

In another aspect, the present invention also provides a heating device comprising: a box type heat exchange tank containing a heat transfer medium having an thermal accumulation effect therein, said heat transfer medium being oil having a viscosity; a heat exchange pipe arranged in said heat exchange tank and having an outlet protruded outwardly through the upper portion of one side wall of the heat exchange tank and an inlet protruded outwardly through the bottom wall of the heat exchange tank; an air discharging member having a flared shape mounted to said outlet of the heat exchange pipe and provided with a fan adapted to blow air in the heat exchange pipe into a room in which the heating device is placed; an air suction member connected to said inlet of the heat exchange pipe and adapted to suck outside air and supply it into the heat exchange pipe; a heater disposed just below said air suction member and adapted to heat an air entering the air suction member; a slidable heating plate disposed between the air suction member and said heater and adapted to transfer a heat generated from the heater to the air suction member; an inlet and an outlet adapted to charge/discharge the heat transfer medium into/from the heat exchange tank and provided at the upper portion of the other side wall of the heat exchange tank and a portion of the bottom wall of the heat exchange tank near one side wall, respectively; and a temperature sensor disposed at the lower portion of one side wall of heat exchange tank, to sense the temperature of the heat transfer medium in the heat exchange tank.

BRIEF DESCRIPTION OF THE DRAWINGS

Other objects and aspects of the invention will become apparent from the following description of embodiments with reference to the accompanying drawings in which:

FIGS. 1 and 2 are a perspective view and a sectional view of a heating device in accordance with a first embodiment of the present invention, respectively;

FIGS. 5 and 6 are a perspective view and a Sectional view of a heating device in accordance with a third embodiment of the present invention, respectively;

FIGS. 7 and 8 are a perspective view and a sectional view of a heating and cooling device in accordance with a fourth embodiment of the present invention, respectively;

DETAILED DESCRIPTION OF THE PREFERRED EMBODIMENTS

Figure 3:
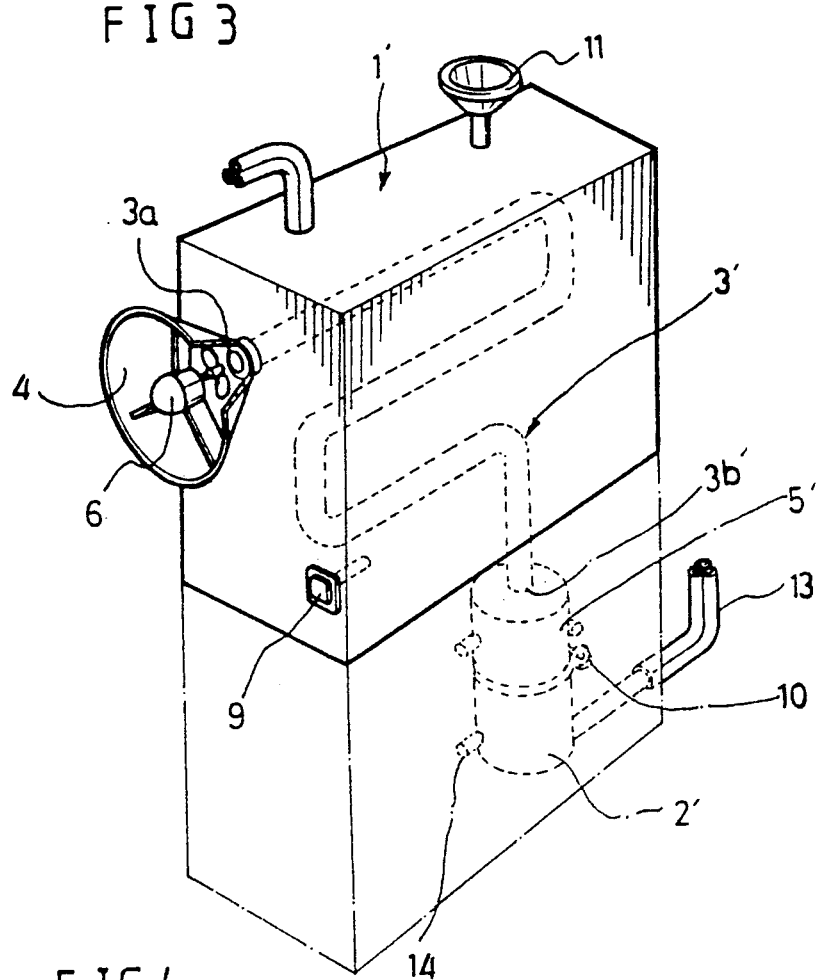
FIGS. 3 and 4 are a perspective view and a sectional view of a heating device in accordance with a second embodiment of the present invention, respectively.

Referring to FIGS. 1 and 2, there is illustrated a heating device in accordance with an embodiment of the present invention. As shown in FIGS. 1 and 2, the heating device comprises a box type heat exchange tank 1 and a heater 2 with a well-known construction. In the heat exchange tank 1, a heat exchange pipe 3 having a small diameter and a certain shape is arranged. The heat exchange pipe 3 has an outlet 3a slightly protruded through the upper portion of one side wall (namely, the left side wall in FIG. 2) of the heat exchange tank 1 and an inlet 3b slightly protruded through the lower portion of the other side wall (namely, the right side wall) of the heat exchange tank 1.

Around the outlet 3a of heat exchange pipe 3, an air discharging member 4 having a flared shape is fixedly fitted. In the air discharging member 4, a fan 6 is mounted, to blow air in the heat exchange pipe 3 into a room in which the heating device is placed. To the inlet 3b of heat exchange pipe 3, an air suction member 5 is connected which is adapted to suck outside air according to the function of fan 6 and supply it into the heat exchange pipe 3 and provided with a filter (not shown).

Within the heat exchange tank 1, a heat transfer medium such as water is contained. For charging/discharging water into/from the heat exchange tank 1, a water inlet 7 and a water outlet 8 are provided at the upper portion of the other side wall of heat exchange tank I and a portion of the bottom Wall of heat exchange tank I near one side wall, respectively.

At the lower portion of one side wall of heat exchange tank 1, a temperature sensor 9 is disposed, to sense the temperature of the heat transfer medium in the heat exchange tank 1. When the temperature sensor 9 senses that the temperature of heat transfer temperature reaches a predetermined temperature, the heater 2 is stopped.

The first embodiment of the present invention with the above-mentioned construction is adapted to be mainly used as a warm air blower. In this construction, as the heater 2 is operated under the condition that the heat transfer medium, namely, water has been filled in the heat exchange tank 1, the water is heated to a predetermined heating temperature; On the other hand, as the fan 6 is operated, outside air enters the heat exchange pipe 3 through the air suction member 5 disposed at the lower portion of the other side wall of heat exchange tank 1. The air which passes through the heat exchange pipe 3 is properly heated by the heated water. This warm air is then discharged into a room through the outlet 3a of heat exchange pipe 3 and the air discharging member 4, thereby providing a room heating effect.

Since the used heat transfer medium has a high thermal accumulation effect in accordance with the present invention, it can be maintained near the predetermined heating temperature, for a long time, even if the heater 2 is operated at a low heating state or temporarily stopped. As a result, it is possible to expect a considerable reduction in energy consumption.

In particular, the heat transfer medium contained in the heat exchange tank I and heated by the heater 2 disposed under the heat exchange tank I has an upper portion maintained at a relatively high temperature by virtue of its convective phenomenon. Accordingly, the air which enters the heat exchange pipe 3 extending from the lower portion of heat exchange tank 1 to the upper portion of heat exchange tank 1 is gradually heated as it flows toward the upper portion of heat exchange pipe 3 which receives a high temperature heat from the upper portion of heat transfer medium. Although the heating device is more or less inferior to the conventional heating device, in terms of a rapid heating function, it exhibits a maximized thermal efficiency and a minimized energy consumption, by virtue of having a superior heat accumulation effect which causes the heated heat transfer medium to be very slowly cooled. As compared with the conventional heating device, the heating device according to the present invention has a simple construction, thereby avoiding any possible failure thereof. Consequently, the mounting and the maintenance of the heating device according to the present invention can be easily carried out, thereby enabling an improvement in economy. In addition, a minimization in noise and a reduction in operation cost can be achieved, in that the total operation time of the heating device and the total number of switchings of the operation can be considerably reduced, by virtue of the thermal accumulation effect.

Figure 4:
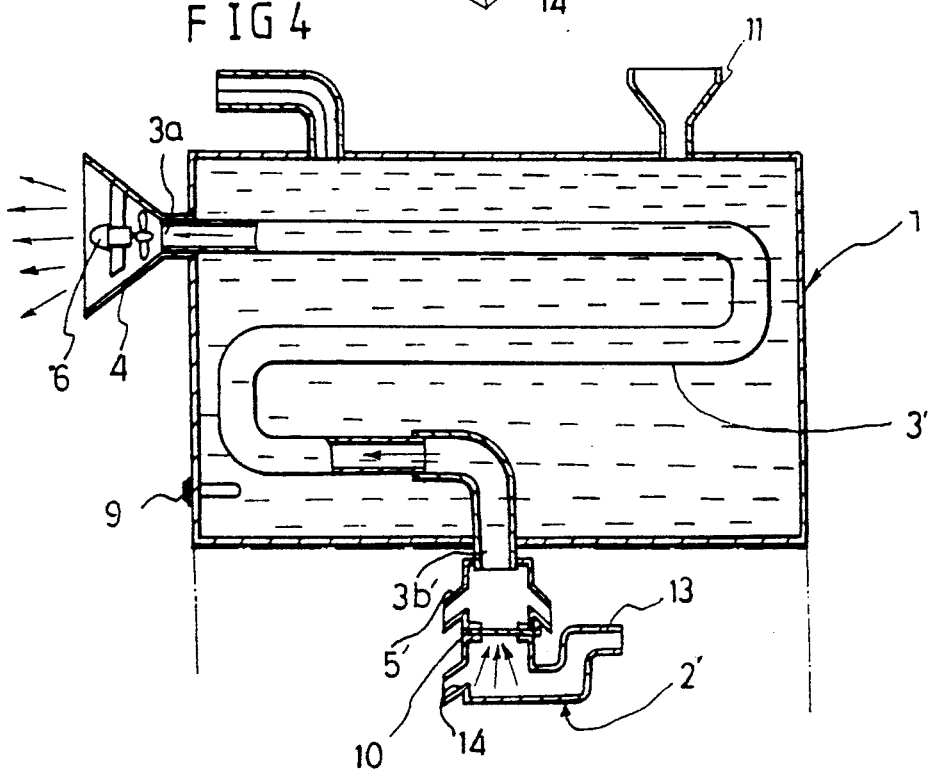

Referring to FIGS. 3 and 4, there is illustrated a heating device according to a second embodiment of the present invention. This heating device has a construction which is more or less modified From the first embodiment shown in FIGS. 1 and 2. That is, the heating device shown in FIGS. 3 and 4 comprises a heat exchange pipe 3' having an inlet 3b' protruded outwardly from the bottom wall of a heat exchange tank 1'. To the inlet 3b' of heat exchange pipe 3', an air suction member 5' is connected. A heater 2' such as a burner is disposed just below the air suction member 5'. A sliding heating plate 10 is disposed between the heater 2' and the air suction member 5' so that air entering the air suction member 5' is heated by a heat generated by the heater 2'. The heating plate 10 also functions to prevent an exhaust gas generated in burning oil or gas in the heater 2' from entering the air suction member 5'. In accordance with this embodiment, a heat transfer medium 20 such as oil having a viscosity and a high thermal accumulation effect is filled in the heat exchange tank 1'. For charging/discharging water into/from the heat exchange tank 1', an oil inlet 11 and an oil outlet 12 are provided at the upper wall of heat exchange tank 1'.

In FIGS. 3 and 4, the reference numerals 13 and 14 denote an exhaust gas outlet and an air inlet provided at the heater 2', respectively. In this embodiment, parts identical to those of the first embodiment are denoted by the same reference numerals.

The heating device according to the second embodiment exhibits an effect substantially identical to that of the first embodiment and is particularly useful when it is adapted to utilize a heat from hot exhaust gas generated in burning of gas or oil. When the exhaust gas is utilized, the heating plate 10 prevents the exhaust gas from entering the air suction member 5', as mentioned above. In case of using an electric power as the energy source, the heating plate 10 may be removed. Thus, the heating device according to the second embodiment has an advantage of using various energy sources such as electric power, gas and oil.

FIGS. 5 and 6 illustrate a heating device according to a third embodiment of the present invention which is different from the above mentioned two embodiments, in that it uses, as a heat transfer medium, stone material or cast iron material having a superior thermal accumulation effect. That is, a heat transfer medium 20 such as stone material or cast iron material is contained in a heat exchange tank 1". Within the heat exchange tank 1", a temperature sensing chamber 21 is also provided. The temperature sensor 9 is disposed in the temperature sensing chamber 21. Other constructions of this embodiment are substantially the same as those of the above-mentioned embodiments. In this embodiment, parts identical to those of the above-mentioned embodiments are denoted by the same reference numerals.

Although the heating device according to the third embodiment has a some difficulty in manufacture and handling because of using heavy stone or cast iron material as the heat transfer medium, it is advantageous in that once it has been placed at a desired area, it performs its functions semi-permanently without any worry about its failure and a leakage of the heat transfer medium. By virtue of the superior thermal accumulation effect, the energy consumption is more reduced. Other effects are substantially the same as those of the above-mentioned two embodiments.

Referring to FIGS. 7 and 8, there is illustrated a heating and cooling device according to a fourth embodiment of the present invention which has a cooling function as well as a heating function. That is, the heating and cooling device comprises a cooling chamber 25 disposed at one side wall (namely, the right wall in FIG. 8) of a heat exchange tank 1'" and provided with a cooler (not shown) with a well-known construction. Below the heat exchange tank 1'", a water pump 26 is disposed, to pump a water such as underground water into the heat exchange tank 1'". The heating and cooling device also comprises a water discharging cock 27 provided at the upper wall of heat exchange tank 1'" and a hot water discharging cock 28 provided at the other side wall (namely, the left wall in FIG. 8) of heat exchange tank 1'". Other constructions of this embodiment are substantially the same as those of the above-mentioned first and second embodiments. In this embodiment, parts identical to those of the above-mentioned embodiments are denoted by the same reference numerals.

The device according to the fourth embodiment can be used as a cooling device in the summer season, by pumping underground water of a relatively low temperature into the heat exchange tank 1 by the water pump 26 to use it as the heat transfer medium and operating the cooler equipped in the cooling chamber 25. In case of using the device as a cooling device, the cooler in the cooling chamber 25 is operated to cool the heat transfer medium to a predetermined cooling temperature. At this state, the fan 6 is operated so that outside air enters the heat exchange pipe 3' through the air suction member 5'. The air which passes through the heat exchange pipe 3' is properly cooled by the cooled water. This cold air is then discharged into a room through the outlet 3a of heat exchange pipe 3' and the air discharging member thereby providing a room cooling effect. If the temperature of the heat transfer medium rises to a predetermined high temperature due to a continued heat exchange between the hot outside air and the heat transfer medium, then the temperature sensor 9 senses this temperature of the heat transfer medium and makes the water pump 26 operate, so as to supply new cold underground water into the heat exchange tank 1'". As the new cold underground water is pumped into the heat exchange tank 1'", the hot heat transfer medium moves upwardly due to a convective process and thereby flows out of the heat exchange tank 1'" through the water discharging cock 27. If the temperature of the heat transfer medium is lowered to a predetermined low temperature again, by virtue of the supply of cold underground water, then the temperature sensor 9 senses this temperature and stops the operation of water pump 26. These procedures are repeated, to continuously provide the room cooling effect.

On the other hand, in case of using the device of the fourth embodiment as a heating device in the winter season, the setting temperature of temperature sensor 9 is properly adjusted and the water pump is maintained at its OFF state. At this state, a room heating effect can be obtained by performing the same procedures as those of the above-mentioned embodiments. If desired, hot water in the heat transfer tank 1'" can be used by discharging it through the hot water discharging cock 28. Other effects obtained when the device is used as a heating device are substantially the same as those of the above-mentioned embodiments.

Figure 9:
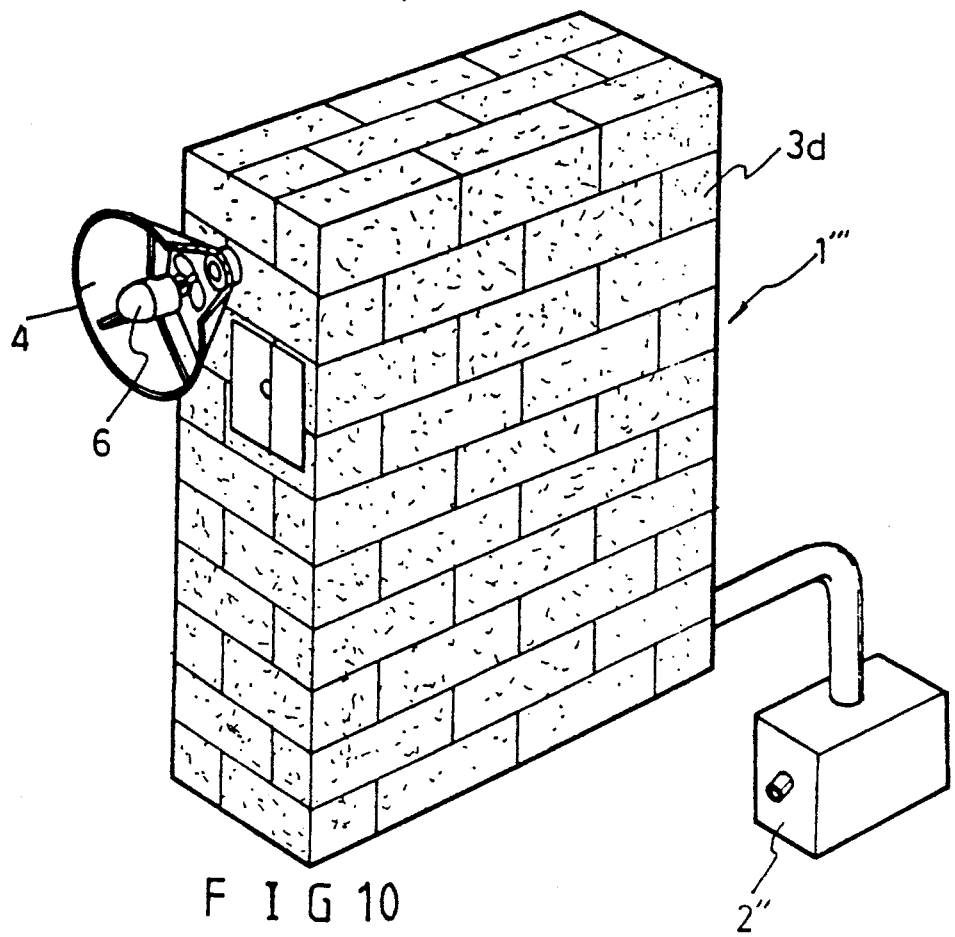
FIGS. 9 and 10 are a perspective view and a sectional view of a heating device in accordance with a fifth embodiment of the present invention, respectively.
Figure 10:
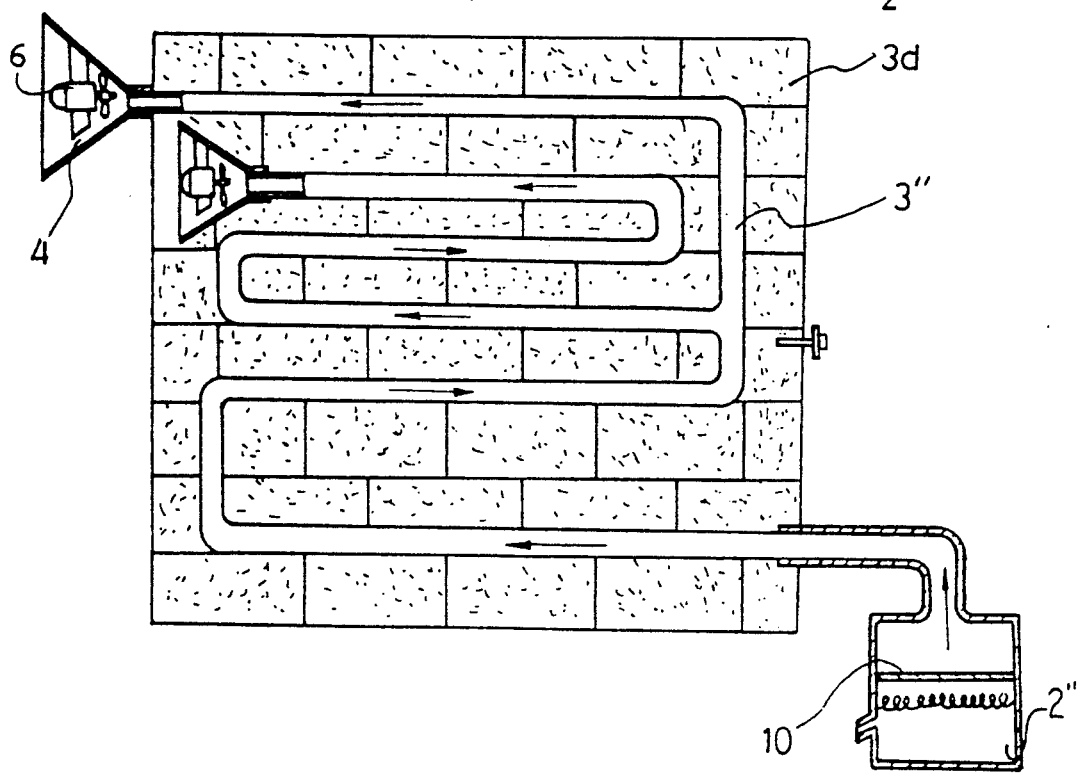

FIGS. 9 and 10 illustrate a device according to a fifth embodiment of the present invention. This embodiment is different from the above-mentioned four embodiments, in that it comprises a heat exchange body 1'''' of a type different from those of the above-mentioned heat transfer tanks. The heat exchange body 1'''' is made by stacking a plurality of blocks 3d having a superior thermal accumulation effect. In the stacked block body, namely, the heat exchange body 1'''', a heat exchange pipe 3'' having a certain arrangement is embedded. Other constructions are similar to those of the above-mentioned embodiments. In this embodiment, parts identical to those of the above-mentioned embodiments are denoted by the same reference numerals.

In FIGS. 9 and 10, an electric heater 2'' is shown as being used as the heater. However, other types of heaters may be equivalently used.

In particular, the device of this embodiment is advantageous, in that its heat exchange body can be directly embedded in the bottom of a room to be heated or constructed to form a part of a wall of the room, to utilize effectively the room space. Other effects are substantially the same as those of the above-mentioned embodiments.

Figure 11A:
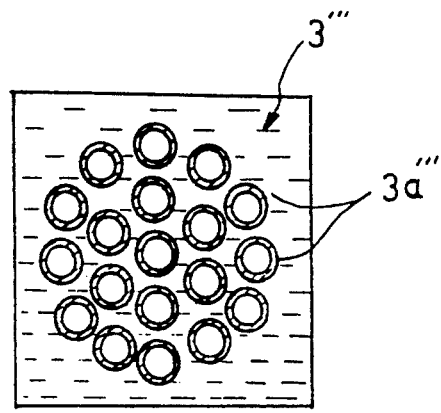
FIG. 11A is a sectional view of a bundle of small diameter heat exchange pipes which can be applied to the first to fifth embodiment of the present invention.
Figure 11B:
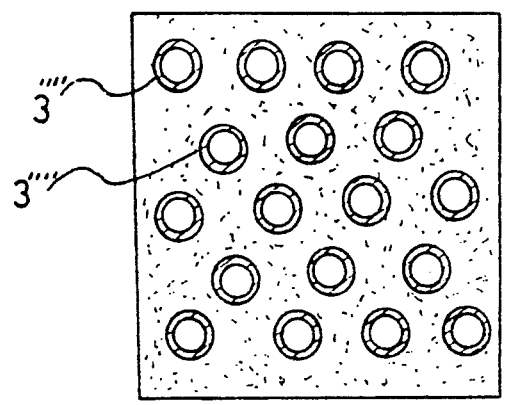
FIG. 11B is a sectional view of a plurality of spaced small diameter heat exchange pipes which can be applied to the first to fifth embodiment of the present invention.

Referring to FIGS. 11A and 11B, there are illustrated modifications in the heat exchange pipe which can be applied to all the above-mentioned embodiments. The embodiment shown in FIG. 11A provides a heat exchange pipe bundle 3''' comprising a plurality of very small diameter heat exchange pipes 3a''''. On the other hand, the embodiment shown in FIG. 11B provides a plurality of spaced small diameter heat exchange pipes 3''''. In these embodiments, a maximized heat exchange area is obtained, so that more improved heating and cooling effects can be achieved.

Although the preferred embodiments of the invention have been disclosed for illustrative purpose, those skilled in the art will appreciated that various modifications, additions and substitutions are possible, without departing from the scope and spirit of the invention as disclosed in the accompanying claims. For example, it may be possible to circulate the heat transfer medium through the heat exchange pipe and supply air in the heat exchange tank. Where in the process of producing fermented manure, as heat is occured naturally by fermentation, warm air can be obtained by using a bundle of small diameter heat exchange pipe, and warm air can be used for agricultural plants in cold winter.

As apparent from the above description, the present invention provides a heating and cooling device which has a simple construction using a heat transfer medium having a thermal accumulation effect. Accordingly, innoxious natural warm or cold air can be easily obtained, thereby providing a more comfortable room atmosphere. Since the device according to the present invention has a simple construction, it is possible to avoid any possible failure. Consequently, the mounting and the maintenance of the device can be easily carried out, thereby enabling an improvement in economy. In addition, a minimization in noise and a reduction in operation cost can be achieved, in that the total operation time of the device and the total number of switchings of the operation can be considerably reduced, by virtue of the thermal accumulation effect.

What is claimed is:

1. A heating device comprising:

a heat exchange tank having a lower portion, an upper portion, a bottom wall, and at least one upstanding sidewall;

a heat transfer medium received in said heat exchange tank, said heat transfer medium comprising water;

heating means disposed below said bottom wall of said heat exchange tank for heating said heat transfer medium, said heat transfer medium normally having a first temperature adjacent said lower portion of said heat exchange tank and a second increased temperature adjacent said upper portion;

a heat exchange pipe extending through said heat transfer medium, said pipe having a substantially horizontal inlet end extending through the sidewall of the heat exchange tank adjacent to said lower portion thereof and a substantially horizontal outlet end extending outwardly through the sidewall of the heat exchange tank adjacent to said upper portion thereof, said heat exchange pipe a plurality of substantially horizontal pipe sections and a plurality of reversely bent pipe sections which wind back and fourth through said heat transfer medium;

a frusto-conical air discharge member mounted on said outlet end of said heat exchange pipe;

an air suction member mounted on said inlet end of said heat exchange pipe;

fan means mounted in said air discharge member for drawing a volume of ambient air into said heat exchange pipe, said ambient air entering said heat exchange pipe through said air suction member at said inlet end and flowing through said horizontal pipe sections to become gradually heated as it flows from said lower portion of said heat exchange tank toward said upper portion of said heat exchange tank, said heated air being discharged through said air discharge member at said outlet end of said heat exchange pipe;

inlet means in the sidewall of said heat exchange tank adjacent the upper portion thereof for filling said tank;

outlet means in the bottom wall of said heat exchange tank for discharging said tank; and temperature sensor means mounted on said sidewall of said heat exchange tank adjacent the lower portion thereof for sensing a temperature of said heat exchange medium.

2. A device in accordance with claim 1, wherein said heat exchange pipe comprises a bundle of small diameter heat exchange pipes, to maximize its heat exchange area.

* * * * *